United States Patent
Jang et al.

(10) Patent No.: US 7,687,190 B2
(45) Date of Patent: Mar. 30, 2010

(54) POUCH-SHAPED SECONDARY BATTERY WITH IMPROVED SAFETY

(75) Inventors: Jun Hwan Jang, Seoul (KR); Hyung Ku Yun, Daejon (KR); Byungjin Choi, Daejeon (KR); Hyang Mok Lee, Seoul (KR)

(73) Assignee: LG Chem, Ltd. (KR)

( * ) Notice: Subject to any disclaimer, the term of this patent is extended or adjusted under 35 U.S.C. 154(b) by 23 days.

(21) Appl. No.: 11/777,553

(22) Filed: Jul. 13, 2007

(65) Prior Publication Data

US 2008/0070100 A1    Mar. 20, 2008

(30) Foreign Application Priority Data

Sep. 18, 2006    (KR)    ................. 10-2006-0089906

(51) Int. Cl.
*H01M 2/08* (2006.01)
*H01M 2/14* (2006.01)
*H01M 2/00* (2006.01)

(52) U.S. Cl. ............... 429/65; 429/129; 429/171; 429/181; 429/162; 429/163; 429/168; 429/178; 429/185

(58) Field of Classification Search ............. 429/171, 429/181, 162, 163, 168, 178, 185
See application file for complete search history.

(56) References Cited

U.S. PATENT DOCUMENTS 6,451,474 B1 * 9/2002 Kozu et al. ............ 429/100

2006/0068275 A1 * 3/2006 Chung et al. ............ 429/121
2007/0264535 A1 * 11/2007 Lee et al. ............... 429/7

FOREIGN PATENT DOCUMENTS

| JP | 2000-195474 | * | 7/2000 |
| JP | 2000-200585 | * | 7/2000 |
| JP | 2005-116278 | * | 4/2005 |
| KR | 10-2001-0082058 | | 8/2001 |
| KR | 10-2001-0082059 | | 8/2001 |
| KR | 10-2001-0082060 | | 8/2001 |

* cited by examiner

*Primary Examiner*—Dah-Wei Yuan
*Assistant Examiner*—Angela J. Martin
(74) *Attorney, Agent, or Firm*—Cantor Colburn LLP

(57) ABSTRACT

Disclosed herein is a secondary battery constructed in a structure in which an electrode assembly having a cathode/separator/anode structure is mounted in a sheet-type battery case having a receiving part defined therein, the sheet-type battery case is sealed by thermal welding, and sealing parts are formed entirely along the edge of the receiving part by the thermal welding. The sealing parts are perpendicularly bent such that the sealing parts are brought into tight contact with a side wall of the receiving part. Cathode and anode terminals are positioned at two different sealing parts about the receiving part, respectively. When external forces are applied to the secondary battery, the safety of the secondary battery is improved, and the occurrence of a short circuit is effectively prevented.

9 Claims, 3 Drawing Sheets

POUCH-SHAPED SECONDARY BATTERY WITH IMPROVED SAFETY

FIELD OF THE INVENTION

The present invention relates to a pouch-shaped secondary battery with improved safety, and, more particularly, to a secondary battery constructed in a structure in which an electrode assembly having a cathode/separator/anode structure is mounted in a sheet-type battery case having a receiving part defined therein, the sheet-type battery case is sealed by thermal welding, and sealing parts are formed entirely along the edge of the receiving part by thermal welding, wherein the sealing parts are perpendicularly bent such that the sealing parts are brought into tight contact with a side wall of the receiving part, and the secondary battery includes cathode and anode terminals positioned at two different sealing parts about the receiving part, respectively.

BACKGROUND OF THE INVENTION

As mobile devices have been increasingly developed, and the demand for such mobile devices has increased, the demand for secondary batteries has also sharply increased as an energy source for the mobile devices. Among them is a lithium secondary battery having high energy density and high discharge voltage, on which much research has been carried out and which is now commercially and widely used.

Based on the appearance thereof, the lithium secondary battery may be classified as a cylindrical battery, a prismatic battery, or a pouch-shaped battery. A recent trend in the miniaturization of mobile devices is increased demand for prismatic batteries or pouch-shaped batteries, which have a small thickness. Especially, the pouch-shaped battery has attracted considerable attention because the form of the battery can be easily changed, the manufacturing costs of the battery are low, and the weight of the battery is small.

Generally, the pouch-shaped secondary battery is constructed in a structure in which an electrode assembly including cathodes, anodes, and separators disposed respectively between the cathodes and the anodes is mounted in a pouch-shaped battery case in a sealed state while two electrode leads, which are electrically connected to cathode and anode taps extending from the electrode assembly, are partially exposed to the outside of the battery case at one end of the battery case.

However, the pouch-shaped battery is constructed in a structure in which the battery case, having a thickness of approximately 113 μm, includes an outer coating layer made of oriented nylon film (ONy), a barrier layer made aluminum, and an inner sealant layer made of cast polypropylene (CPP). As a result, the pouch-shaped battery may be easily damaged when physical impacts are applied to the pouch-shaped battery or a pointed object presses the pouch-shaped battery, and therefore, the pouch-shaped battery may catch fire or explode. In order to solve this problem, therefore, there are technologies being generally used for increasing the thickness of the battery case or using an additional member, such as an outer case made of a material having high mechanical strength. However, the increase of the thickness of the battery case or the use of the additional member increases the volume of the pouch-shaped battery and complicates a process for manufacturing the pouch-shaped battery.

Consequently, the present invention provides a technology for deforming sealing parts of a battery case to improve the safety of the battery case against impacts applied to the battery case without increasing the volume of a battery and affecting the process for manufacturing the battery.

In this connection, Japanese Patent Application Publication No. 2005-116278 discloses a technology for winding sealing parts of a battery case in the direction where an electrode assembly receiving part of the battery case is positioned such that the sealing parts of the battery case is brought into tight contact with the electrode assembly receiving part of the battery case. This technology is to prevent the leakage of an electrolyte from the battery case. However, this technology has a problem in that the battery case between the winded sealing parts and the electrode assembly receiving part may be weakened and thus damaged.

Also, Japanese Patent Registration No. 3527858 discloses a technology for bending sealing parts formed along the edge of an electrode assembly receiving part of a battery case and bending ends of the respective sealing parts by plastic deformation. In the disclosed technology, electrode terminals protrude in the same direction at one end of the battery case. However, this technology has a problem in that it is difficult to connect the electrode terminals to corresponding electrode taps, and a short circuit may occur when external forces are applied to the battery case. Furthermore, since the sealing parts are bent and deformed by plastic deformation, the sealing parts, which are made of a laminate sheet and formed by thermal welding, may be excessively deformed with the result that the mechanical strength and the coupling force of the sealing parts may be reduced, and the manufacturing process is complicated.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present invention have found that, in a secondary battery constructed in a structure in which an electrode assembly having a cathode/separator/anode structure is mounted in a sheet-type battery case having a receiving part defined therein, the sheet-type battery case is sealed by thermal welding, and sealing parts are formed entirely along the edge of the receiving part by the thermal welding, when the thermally welded sealing parts are perpendicularly bent such that the sealing parts are brought into tight contact with a side wall of the receiving part, the safety of the battery case is improved, and, when cathode and anode terminals positioned at two opposite sealing parts about the receiving part, the occurrence of a short circuit is effectively prevented. The present invention has been completed based on these findings.

In accordance with one aspect of the present invention, the above and other objects can be accomplished by the provision of a secondary battery constructed in a structure in which an electrode assembly having a cathode/separator/anode structure is mounted in a sheet-type battery case having a receiving part defined therein, the sheet-type battery case is sealed by thermal welding, and sealing parts are formed entirely along the edge of the receiving part by the thermal welding, wherein the sealing parts are perpendicularly bent such that the sealing parts are brought into tight contact with a side wall of the receiving part, and the secondary battery includes electrode terminals, i.e., cathode and anode terminals, positioned at two different sealing parts about the receiving part, respectively.

In the secondary battery according to the present invention, the sealing parts are formed along the entire edge of the receiving part, and the sealing parts are bent such that the sealing parts are brought into tight contact with the side wall of the receiving part. Consequently, the strength of the battery case, forming the appearance of the secondary battery, is improved. Furthermore, the electrode terminals are positioned at two different sealing parts. Consequently, the occurrence of a short circuit is effectively prevented.

According to the present invention, the sheet-type battery case is made of a laminate sheet including a resin layer and a metal layer. Preferably, the sheet-type battery case is applied to a secondary battery having an electrode assembly mounted in a pouch-shaped battery case made of an aluminum laminate sheet.

As described above, the electrode terminals are positioned at two different sealing parts about the receiving part. In other words, the electrode terminals are not positioned at the same sealing part. In this case, the electrode terminals may be positioned at the corresponding sealing parts about the receiving part in a symmetrical or asymmetrical fashion. For example, the electrode terminals may be positioned in the symmetrical fashion in which the electrode terminals are positioned at two sealing parts opposite to each other about the receiving part on a middle axis passing through the middle of the opposite sealing parts or any one selected from a plurality of axes parallel with the middle axis. Alternatively, the electrode terminals may be positioned in the asymmetrical fashion in which the electrode terminals are positioned at two sealing parts opposite to each other about the receiving part on two different axes selected from a plurality of axes parallel with a middle axis passing through the middle of the opposite sealing parts. According to circumstances, the electrode terminals may be positioned at neighboring sealing parts.

The electrode assembly is particularly restricted so long as the electrode assembly is constructed in a structure including cathodes, anodes, and separators disposed respectively between the cathodes and the anodes. For example, the electrode assembly may be constructed in a folding, stacking, or stacking/folding structure. The details of the stacking/folding type electrode assembly are disclosed in Korean Patent Application Publication No. 2001-0082058, No. 2001-0082059, and No. 2001-0082060, which have been filed in the name of the applicant of the present patent application. The disclosures of the above-mentioned patent application publications are hereby incorporated by reference as if fully set forth herein.

In a preferred embodiment, the electrode assembly is constructed in a structure in which pluralities of cathodes, anodes, and separators are sequentially stacked one on another. Specifically, the electrode assembly may be generally constructed in a plate-shaped hexahedral structure. In this case, the battery case, in which the electrode assembly is mounted in a sealed state, may include a hexahedral receiving part corresponding to the electrode assembly and sealing parts formed along the edge of the receiving part such that the sealing parts are positioned in a rectangular structure. Intersections between the sealing parts positioned in the rectangular structure may be chamfered to a predetermined size such that the sealing parts are easily bent, whereby the sealing parts are brought into tight contact with the side wall of the receiving part.

In a structure according to a preferred embodiment, the secondary battery further includes at least one protection circuit part mounted to the perpendicularly bent sealing parts where the electrode terminals are positioned, in the direction in which the protection circuit part is stably located on the side wall of the receiving part. More specifically, the protection circuit part may be mounted to the corresponding sealing part in tight contact with the side wall of the receiving part while the protection circuit part is electrically connected to the corresponding electrode terminal. At this time, the protection circuit part may be mounted to the corresponding sealing part while the protection circuit part is parallel with the side wall of the receiving part, whereby the protection circuit part is more stably mounted. With this structure, the secondary battery according to the present invention has an advantage in that the increase in volume of the secondary battery due to the mounting of the protection circuit part is minimized.

In the above-described structure, the protection circuit part may be mounted to the cathode terminal side sealing part and/or the anode terminal side sealing part. Preferably, two protection circuit parts are mounted to the cathode terminal side sealing part and the anode terminal side sealing part, respectively.

In a structure according to another preferred embodiment, the secondary battery further includes at least one excess part formed at an upper battery case and/or a lower battery case such that the excess part extends from the corresponding side sealing part adjacent to the cathode or anode terminal side sealing part, the excess part having a size corresponding to the width of the receiving part. In this case, the excess part covers a top surface or a bottom surface of the receiving part when the corresponding sealing part is perpendicularly bent such that the sealing part is brought into tight contact with the side wall of the receiving part. For example, when the top surface of the receiving part is to be covered by the excess part, a corresponding side sealing part, from which the excess part extends, is perpendicularly bent upward toward the top surface of the receiving part such that the side sealing part is brought into tight contact with a portion of the side wall of the receiving part, and the excess part extending from the side sealing part is perpendicularly bent toward the opposite portion of the side wall of the receiving part such that the excess part is brought into tight contact with the top surface of the receiving part. On the other hand, when the bottom surface of the receiving part is to be covered by the excess part, a corresponding side sealing part, from which the excess part extends, is perpendicularly bent upward downward the bottom surface of the receiving part such that the side sealing part is brought into tight contact with a portion of the side wall of the receiving part, and the excess part extending from the side sealing part is perpendicularly bent toward the opposite portion of the side wall of the receiving part such that the excess part is brought into tight contact with the bottom surface of the receiving part.

According to circumstances, it is preferable for the excess part to extend from a corresponding sealing part at the upper battery case or the lower battery case, thereby minimizing the increase in volume of the secondary battery due to the battery case. More preferably, the excess part extends from a corresponding sealing part at the battery case located on the inside in the direction in which the sealing part is bent. Specifically, when the sealing part, from which the excess part extends, is bent toward the top surface of the receiving part, the excess part may be formed at the upper battery case which is located on the inside in the bending direction.

In the above-described structure, two excess parts may be formed at the battery case such that the two excess parts extend from the side sealing parts adjacent to the electrode terminal side sealing parts, respectively. For example, when the top surface of the receiving part is to be covered by an excess part extending from one side sealing part, and the bottom surface of the receiving part is to be covered by another excess part extending from the opposite side sealing part, the one side sealing part is perpendicularly bent upward toward the top surface of the receiving part such that the one side sealing part is brought into tight contact with a portion of the side wall of the receiving part, and the excess part extending from the one side sealing part is perpendicularly bent toward the opposite portion of the side wall of the receiving part such that the excess part is brought into tight contact with the top surface of the receiving part. Also, the other side sealing part is perpendicularly bent downward toward the bottom surface of the receiving part such that the other side sealing part is brought into tight contact with a portion of the side wall of the receiving part, and the excess part extending from the other side sealing part is perpendicularly bent toward the opposite portion of the side wall of the receiving part such that the excess part is brought into tight contact with the bottom surface of the receiving part. By the provision of this structure, the top and bottom surfaces of the receiving part are completely covered by the excess parts extending from the respective side sealing parts. Consequently, the safety of the battery case against external forces is further improved.

In accordance with another aspect of the present invention, there is provided a battery pack including the above-described secondary battery mounted in a pack case. A medium- or large-sized battery pack, which is used for electric vehicles and hybrid electric vehicles, is exposed to severe conditions in which external forces, such as vibrations and impacts, are applied to the battery pack for a long period of time. Also, the medium- or large-sized battery pack is constructed by combining a plurality of unit cells. As a result, the outer surfaces of the unit cells may be damaged due to the external forces, and a process for sequentially connecting the unit cells is very complicated. Consequently, the secondary battery with the above-stated construction according to the present invention is preferably applied to the medium- or large-sized battery pack as a unit cell of the medium- or large-sized battery pack.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
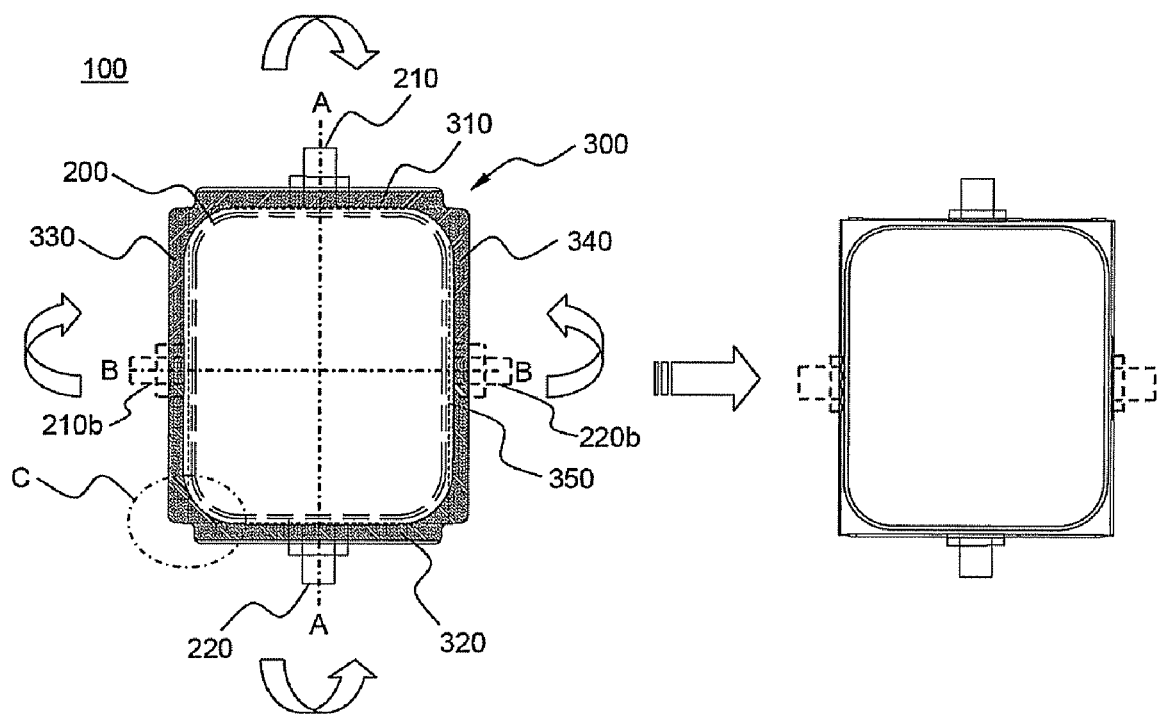
FIG. 1 is a plan view illustrating a process for bending sealing parts of a battery case such that the sealing parts are brought into tight contact with a side wall of an electrode assembly receiving part of the battery case in a secondary battery according to a preferred embodiment of the present invention.

FIG. 1 is a plan view typically illustrating a process for bending sealing parts of a battery case such that the sealing parts are brought into tight contact with a side wall of an electrode assembly receiving part of the battery case in a pouch-shaped secondary battery according to a preferred embodiment of the present invention.

Referring to FIG. 1, a pouch-shaped secondary battery 100 is constructed in a structure in which an electrode assembly 200 is mounted in a battery case 300 made of a laminate sheet. A cathode terminal 210 and an anode terminal 220 protrude from an upper-end sealing part 310 and a lower-end sealing part 320, which are opposite to each other about an electrode assembly receiving part 350, respectively. Sealing parts 310, 320, 330, and 340 formed along the edge of the electrode assembly receiving part 350 are bent such that the sealing parts 310, 320, 330, and 340 are brought into tight contact with the electrode assembly receiving part 350.

The sealing parts 310, 320, 330, and 340 formed along the edge of the electrode assembly receiving part 350 are positioned in a rectangular structure when viewing the plane view of the pouch-shaped secondary battery 100. The sealing parts 310, 320, 330, and 340 are bent in the directions indicated by arrows such that the sealing parts 310, 320, 330, and 340 are brought into tight contact with the electrode assembly receiving part 350. This bending process is shown in more detail in FIGS. 2 and 3, which typically illustrate sectional views taken along lines A-A and B-B of FIG. 1, respectively.

Figure 2:
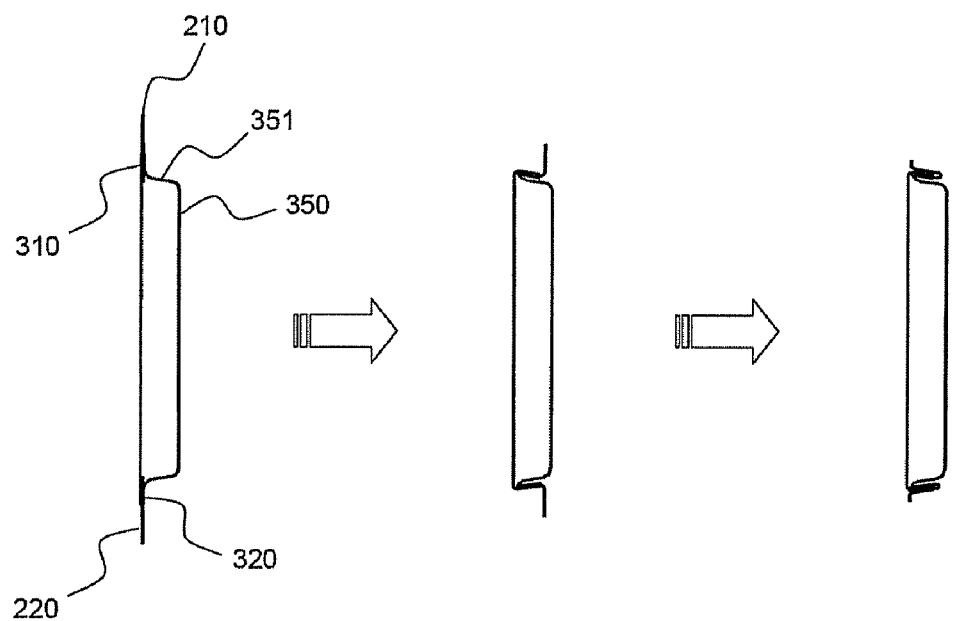
FIG. 2 is a sectional view taken along line A-A of FIG. 1.
Figure 4:
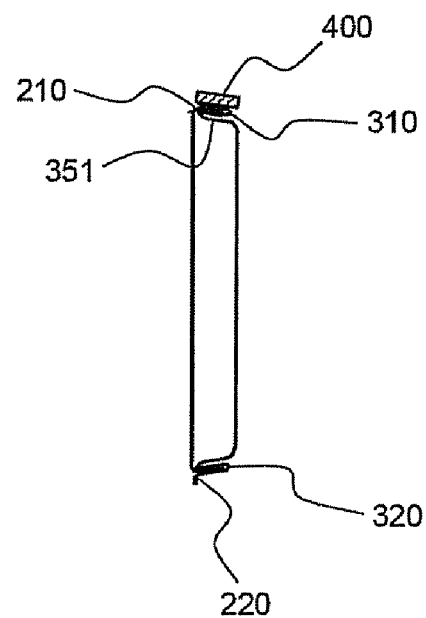
FIG. 4 is a sectional view illustrating a modification of the secondary battery shown in FIG. 1.

Referring first to FIG. 2, the upper-end sealing part 310 and the lower-end sealing part 320 are primarily bent at regions where the upper-end sealing part 310 and the lower-end sealing part 320 are adjacent to the electrode assembly receiving part 350 such that the upper-end sealing part 310 and the lower-end sealing part 320 are brought into tight contact with a side wall 351 of the electrode assembly receiving part 350. The cathode terminal 210 and the anode terminal 220 are secondarily bent at regions where the cathode terminal 210 and the anode terminal 220 are adjacent to the upper-end sealing part 310 and the lower-end sealing part 320, respectively, such that the cathode terminal 210 and the anode terminal 220 are perpendicular to the side wall 351 of the electrode assembly receiving part 350. According to circumstances, the cathode terminal 210 and the anode terminal 220 may be further perpendicularly bent at regions where the cathode terminal 210 and the anode terminal 220 are adjacent to the upper-end sealing part 310 and the lower-end sealing part 320, respectively, such that the cathode terminal 210 and the anode terminal 220 are directed toward the side wall 351 of the electrode assembly receiving part 350. In this state, a protection circuit part 400 may be mounted to the battery case as shown in FIG. 4.

Figure 3:
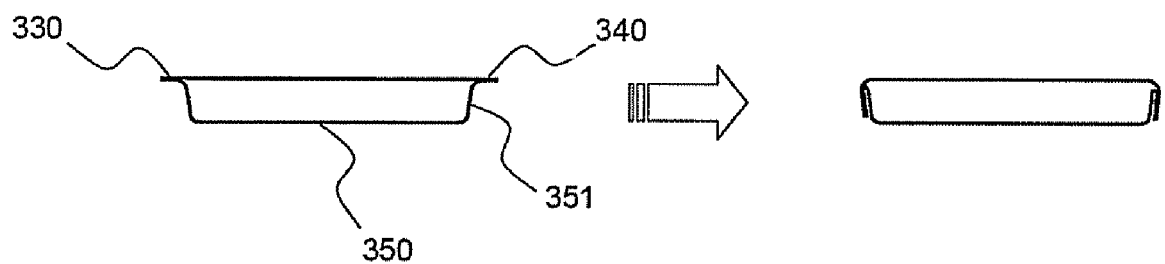
FIG. 3 is a sectional view taken along line B-B of FIG. 1.

Referring to FIG. 3, the side sealing parts 330 and 340 are bent at regions where the side sealing parts 330 and 340 are adjacent to the electrode assembly receiving part 350 such that the side sealing parts 330 and 340 are brought into tight contact with the side wall 351 of the electrode assembly receiving part 350.

Referring back to FIG. 1, corners of the rectangular structure constituted by the sealing parts 310, 320, 330, and 340 are chamfered. Specifically, intersections between the upper-end sealing part 310 and the side sealing parts 330 and 340 and intersections between the lower-end sealing part 320 and the side sealing parts 330 and 340 are cut off (the intersection between the lower-end sealing part 320 and the side sealing part 330 is indicated in a dotted-line circle C), whereby the sealing parts 310, 320, 330, and 340 are easily bent toward the side wall of the electrode assembly receiving part 350.

As another example, the electrode assemblies may be positioned at the side sealing parts 330 and 340 about the electrode assembly receiving part 350 while the electrode assemblies are opposite to each other. Specifically, a cathode terminal 210b may be positioned at the left-side sealing part 330, and an anode terminal 220b may be positioned at the right-side sealing part 340. According to circumstances, the electrode terminals may be positioned at neighboring sealing parts. For example, the cathode terminal 210 may be positioned at the upper-end sealing part 310, and the anode terminal 220b may be positioned at the right-side sealing part 340 such that the electrode terminals are at an angle of approximately 90 degrees to each other about the electrode assembly receiving part 350.

FIG. 4 is a sectional view typically illustrating a modification of the secondary battery shown in FIG. 1.

Referring to FIG. 4, a secondary battery 101 is constructed in a structure in which an additional protection circuit part 400 is electrically connected to the cathode terminal 210 bent as shown in FIG. 2. When the cathode terminal 210 is perpendicularly bent at the region where the cathode terminal 210 is adjacent to the upper-end sealing part 310 such that the cathode terminal 210 is directed toward the side wall 351 of the electrode assembly receiving part 350, the protection circuit part 400 may be mounted on the upper-end sealing part 310, which is in tight contact with the side wall 351 of the electrode assembly receiving part 350. Although not shown in the drawing, the protection circuit part 400 may be mounted to the lower-end sealing part 320, where the anode terminal 220 is formed, in the same manner.

Figure 5:
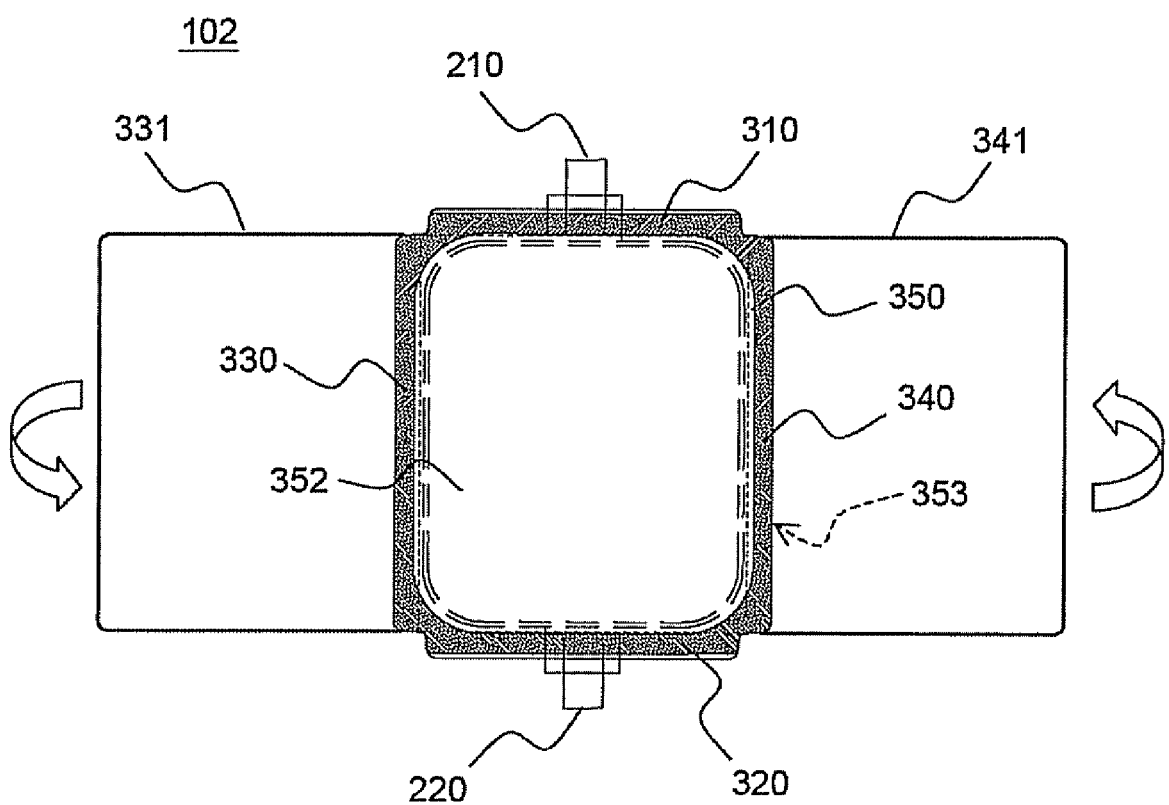
FIG. 5 is a plan view illustrating another modification of the secondary battery shown in FIG. 1.

FIG. 5 is a plan view typically illustrating another modification of the secondary battery shown in FIG. 1.

Referring to FIG. 5, a secondary battery 102 may be constructed in a structure in which excess parts 331 and 341 extending from the side sealing parts 330 and 340 cover a top surface 352 of the electrode assembly receiving part 350 and a bottom surface 353 of the electrode assembly receiving part 350. The left-side sealing part 330 is primarily bent at the region where the left-side sealing part 330 is adjacent to the electrode assembly receiving part 350 such that the left-side sealing part 330 is brought into tight contact with the side wall 351 of the left-side sealing part 330. The left-side excess part 331 extending from the left-side sealing part 330 is secondarily bent at a region where the left-side excess part 331 is adjacent to the left-side sealing part 330 such that the left-side excess part 331 covers the top surface 352 of the electrode assembly receiving part 350.

On the other hand, the right-side sealing part 340 and the right-side excess part 341 extending from the right-side sealing part 340 are bent at regions where the right-side sealing part 340 and the right-side excess part 341 are adjacent to the electrode assembly receiving part 350 such that the right-side excess part 341 covers the bottom surface 353 of the electrode assembly receiving part 350. By the provision of this structure, the safety of the battery case 300 against external forces is further improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As apparent from the above description, the secondary battery according to the present invention is constructed in a structure in which the thermally welded sealing parts of the battery case, which are positioned along the edge of the electrode assembly receiving part, are entirely bent such that the sealing parts are brought into tight contact with the side wall of the electrode assembly receiving part. Consequently, the safety of the battery case is improved. Furthermore, it is possible to position the cathodes and the anodes at two different sealing parts about the electrode assembly receiving part. Consequently, the occurrence of a short circuit is effectively prevented.

What is claimed is:

1. A secondary battery constructed in a structure in which an electrode assembly having a cathode/separator/anode structure is mounted in a sheet-type battery case having a receiving part defined therein, the sheet-type battery case is sealed by thermal welding, and sealing parts are formed entirely along the edge of the receiving part by the thermal welding, wherein the sealing parts are perpendicularly bent such that the sealing parts are brought into tight contact with a side wall of the receiving part, and the secondary battery includes cathode and anode terminals positioned on opposite sides of the receiving part, respectively, and at least one protection circuit part is mounted on the perpendicularly bent sealing parts where the cathode and anode terminals are positioned, in the direction in which the protection circuit part is stably located on the side wall of the receiving part, and at least one excess part is formed at an upper and/or a lower portion of the battery case such that the excess part extends from the corresponding side sealing part adjacent to the cathode or anode terminal side sealing part, the excess part having a size corresponding to the width of the receiving part, wherein, when the corresponding sealing part is perpendicularly bent such that the sealing part is brought into tight contact with the side wall of the receiving part, the excess part covers a top surface or a bottom surface of the receiving part.

2. The secondary battery according to claim 1, wherein the sheet-type battery case is made of a laminate sheet including a resin layer and a metal layer.

3. The secondary battery according to claim 1, wherein the sheet is an aluminum laminate sheet.

4. The secondary battery according to claim 1, wherein the cathode and anode terminals protrude from the corresponding sealing parts about the receiving part in a symmetrical or asymmetrical fashion.

5. The secondary battery according to claim 1, wherein the electrode assembly is constructed in a folding, stacking, or stacking/folding structure.

6. The secondary battery according to claim 1, wherein the electrode assembly is constructed in a plate-shaped hexahedral structure, and intersections between the sealing parts are chamfered to a predetermined size such that the sealing parts are easily bent.

7. The secondary battery according to claim 1, wherein the at least one protection circuit part includes two protection circuit parts mounted to the cathode terminal side sealing part and the anode terminal side sealing part, respectively.

8. The secondary battery according to claim 1, wherein the at least one excess part includes two excess parts formed at the battery case such that the two excess parts extend from the side sealing parts adjacent to the cathode and anode terminal side sealing parts, respectively, and the top and bottom surfaces of the receiving part are completely covered by the corresponding excess parts of the side sealing parts.

9. A battery pack including a secondary battery according to claim 1 mounted in a pack case.

\* \* \* \* \*